US012650695B1

(12) United States Patent
Brady et al.

(10) Patent No.: US 12,650,695 B1
(45) Date of Patent: Jun. 9, 2026

(54) GUIDING ROBOTS TRANSPORTING CONTAINERS USING APPLIED FORCE DETECTION

(71) Applicant: Amazon Technologies, Inc., Seattle, WA (US)

(72) Inventors: Matthew Anthony Brady, Boston, MA (US); Dincer Bozkaya, Andover, MA (US); Rakesh Mishra, Hudson, MA (US); Jonathan Lee Zerez, Waltham, MA (US); Eric Jones, Somerville, MA (US); Chris John Schuchmann, Rockledge, FL (US); Stephen Charles Paschall, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 18/539,565

(22) Filed: Dec. 14, 2023

(51) Int. Cl.
*G05D 1/241* (2024.01)
*G05D 1/646* (2024.01)

(52) U.S. Cl.
CPC ............. *G05D 1/241* (2024.01); *G05D 1/646* (2024.01)

(58) Field of Classification Search
CPC .............................. G05D 1/241; G05D 1/646
See application file for complete search history.

(56) References Cited

U.S. PATENT DOCUMENTS 9,943,963 B2 * 4/2018 Wise ...................... B25J 9/1674
10,493,624 B1 * 12/2019 Nabat ................... B62B 5/0073
11,052,535 B2 * 7/2021 Parks, II ................. B66F 9/063
11,358,706 B2 * 6/2022 Coco ..................... G01G 19/022
2015/0223891 A1 * 8/2015 Miller .................... A61B 50/15
726/19
2015/0366743 A1 * 12/2015 Katayama ................ A61H 3/04
701/99
2016/0089283 A1 * 3/2016 DeLuca ................... A61G 7/08
180/413
2017/0211999 A1 * 7/2017 Bradford ................ B25J 13/085
2019/0179329 A1 * 6/2019 Keivan ................ G05D 1/0221
(Continued)

FOREIGN PATENT DOCUMENTS

EP 2979964 B1 8/2017
JP 2002114151 A 4/2002
KR 20180133425 A 12/2018

OTHER PUBLICATIONS

Great Britain Search Report, Corresponding to Application No. GB2409219.9, mailed Dec. 12, 2024, 4 pages.

*Primary Examiner* — Jason Holloway
*Assistant Examiner* — Blake A Wood
(74) *Attorney, Agent, or Firm* — Eversheds Sutherland (US) LLP

(57) ABSTRACT

Systems and methods are disclosed for guiding robots transporting containers using applied force detection. In one embodiment, an example mobile robot is configured to transport a container. The mobile robot can include a first sensor, a second sensor, a motor, and a controller. The controller may be configured to determine that the container is loaded, determine, using at least one of the first sensor or the second sensor, a first change in load distribution, and determine a first direction of movement associated with the first change. The controller may cause the motor to automatically propel the mobile robot in the first direction of movement.

19 Claims, 10 Drawing Sheets

(56)                    References Cited

U.S. PATENT DOCUMENTS

| | | | | |
|---|---|---|---|---|
| 2019/0377357 | A1* | 12/2019 | Lee ........................ | G05D 1/0282 |
| 2020/0189120 | A1* | 6/2020 | Weaver ................... | B25J 9/1676 |
| 2020/0262460 | A1* | 8/2020 | Kim ........................ | B62B 5/0073 |
| 2020/0298405 | A1* | 9/2020 | Park ......................... | B25J 9/162 |
| 2022/0388560 | A1* | 12/2022 | Niwa ........................ | A61G 7/08 |

* cited by examiner

GUIDING ROBOTS TRANSPORTING CONTAINERS USING APPLIED FORCE DETECTION

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
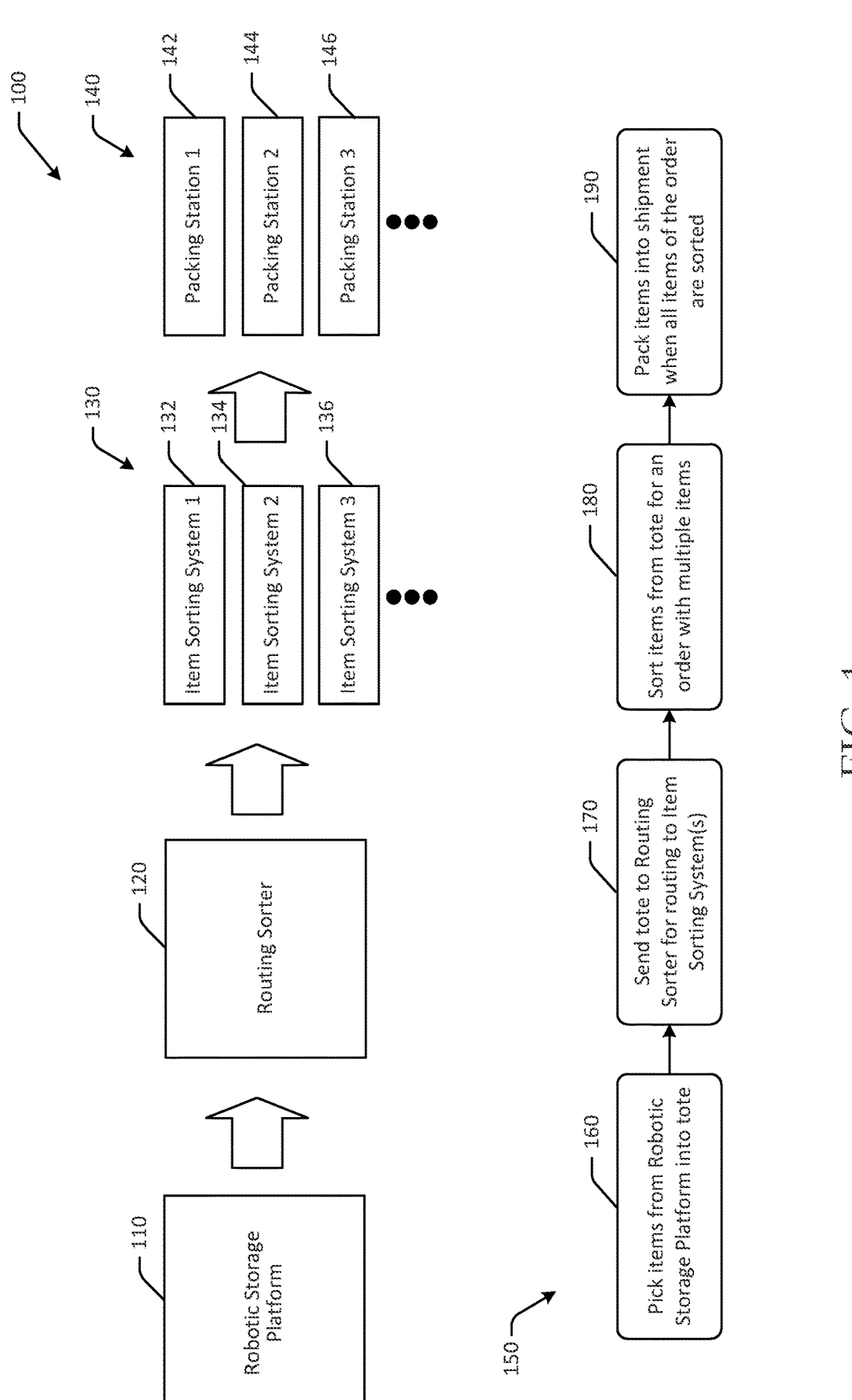
FIG. 1 is a hybrid schematic illustration of an example use case for guiding robots transporting containers using applied force detection and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers or packages for transport, sortation, etc., the packages may be placed in foldable or non-foldable containers that are configured to hold a plurality of packages. For example, a foldable container may be filled with packages that are destined for another fulfillment center or other facility. The foldable containers described herein may be used not only to store and transport packages or other items within a facility, but may also be used to transport the packages to another facility. For example, in some embodiments, the foldable containers may be filled with packages, and the filled foldable container may be loaded onto a truck and transported to another facility. At the destination facility, the entire foldable container may be unloaded from the truck and scanned to identify the contents of the foldable container, without having to empty the foldable container. This may allow for increased efficiency and reduced handling of individual packages, and may also provide the ability for foldable containers to be used across any number of facilities and/or workstations within a facility.

Once the foldable container is unloaded from a truck, or otherwise reaches its destination within a facility (e.g., if the foldable container does not leave a facility, etc.), the foldable container may be dumped so as to remove its contents (e.g., from its open top, etc.). For example, the foldable container may be dumped onto a conveyor, such that the packages or other items inside the foldable container fall onto the conveyor. Foldable containers may be dumped manually (e.g., using equipment, etc.) or automatically.

When carts or other foldable containers are transported manually, operators may be aware of the orientation of the cart and may position the cart such that certain features, such as wheel locks, are easily accessible. However, when robots transport such carts, the robots may not be aware of the particular orientation of a cart. In one example, when loading carts into a trailer, a robot may not be aware of the location of cart brake releases and may load the cart or other container in a suboptimal orientation. Moreover, carts or containers may be transported throughout a facility and/or on and off of trailers using autonomous robots. Such autonomous robots may autonomously navigate throughout various environments.

Humans may interact with autonomous robots at times, such as to move the autonomous robot to a specific location and/or to control a direction of travel of the autonomous robot. In some embodiments, mobile robots may be used, where such mobile robots may be semi-autonomous or non-autonomous, whereas other embodiments may use autonomous robots. To facilitate human-robot interaction, some embodiments allow humans to control movement of a mobile robot (which may or may not be autonomous) by providing manual force input on a payload of the robot. The mobile robot may detect the force and determine a corresponding direction and/or speed of travel, thereby providing an intuitive and ergonomic way to intervene and allow manual movement of a mostly hidden robot. Embodiments may allow for automated force feedback detection for autonomous robots that may be transporting containers, such as carts, where the detected force may be applied on the container and not directly on the autonomous robot. If force feedback is detected, some embodiments allow for corresponding translation into a direction of movement for the robot.

Embodiments of the disclosure therefore include guiding robots transporting containers using applied force detection that maintain overall autonomous functionality and improve ergonomics, reduce processing time, and increase throughput by avoiding jams. The configuration of foldable containers described herein may be compatible with autonomous robots, as well as with manual manipulation, while at the same time providing rigid support for transport and/or storage of items or packages within and between facilities.

U.S. patent application Ser. No. 17/545,356, titled "Foldable Containers with Improved Dumping Features," describing various aspects of a foldable container, U.S. patent application Ser. No. 18/498,500, titled "Automated Force Feedback Detection for Autonomous Robots Transporting Containers," describing various techniques to pause or stop movement of an autonomous robot, and U.S. patent application Ser. No. 17/202,693, titled "Foldable Containers for Manual and Robotic Use," describing various features of a foldable container for manual and robotic use, are both hereby incorporated by reference in their entireties. Non-foldable containers may be transported by the autonomous robots described herein as well. Embodiments may therefore provide a number of benefits, including facilitating manual control over autonomous robot movement.

Embodiments of the disclosure include guiding robots transporting containers using applied force detection, where the containers can be moved by both robots and operators. For example, foldable containers may be pushed, pulled, or otherwise manipulated manually by human operators, and may also be lifted and moved or transported by robots. Some robots may lift the foldable containers from a bottom surface or a bottom platform. The foldable containers may be configured to fold and be stored or stacked in a nested configuration to save space as well.

Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for guiding robots transporting containers using applied force detection and an example process flow is depicted in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in foldable containers in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. For example, the packages may be placed into foldable containers for shipment to another fulfillment center, a sort center, or another facility. At the subsequent facility, the foldable container may be dumped to remove its contents.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
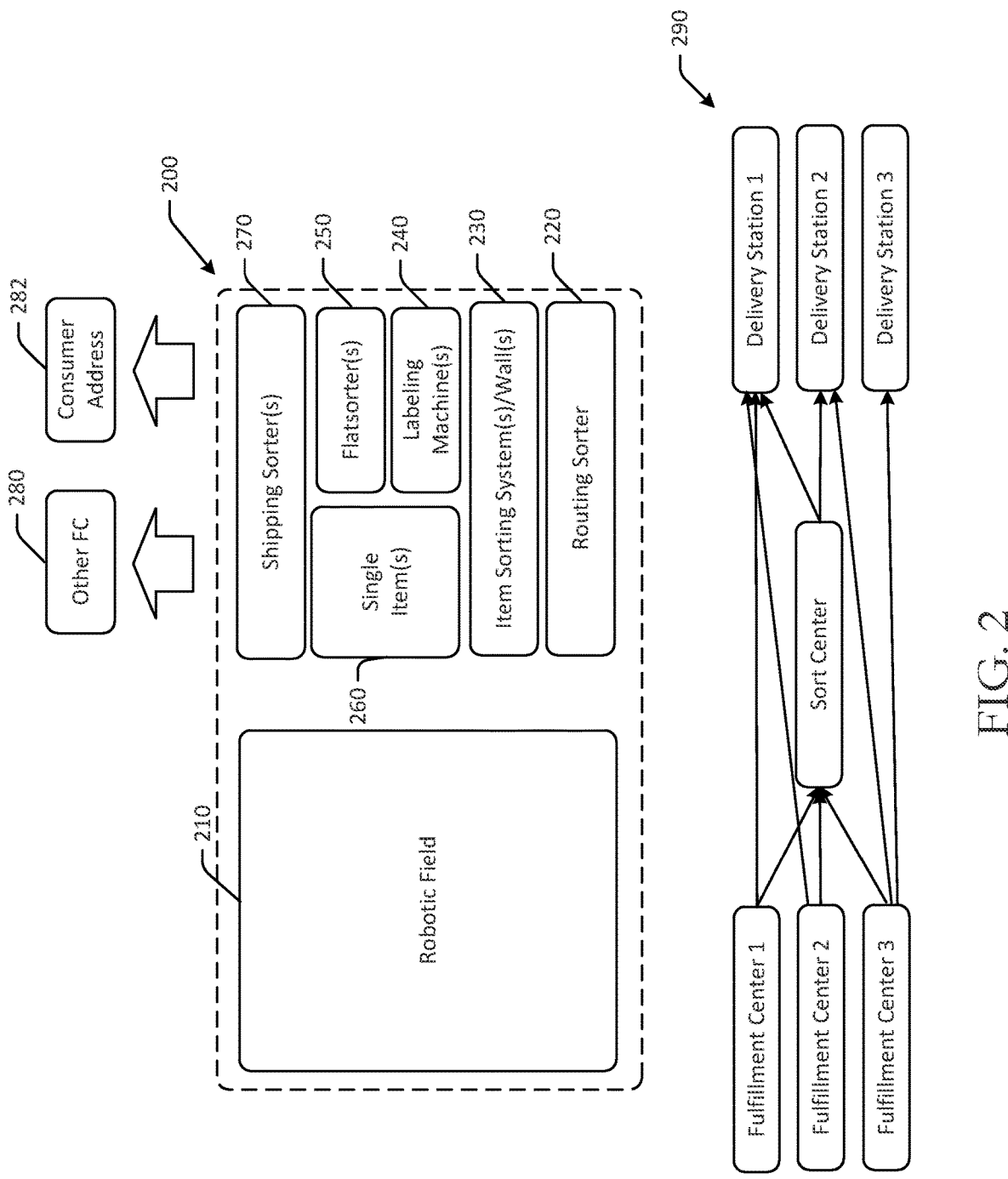
FIG. 2 is a hybrid schematic illustration of an example use case for guiding robots transporting containers using applied force detection throughout a facility and between facilities in accordance with one or more embodiments of the disclosure.

FIG. 2 is a hybrid schematic illustration of an example use case for guiding robots transporting containers using applied force detection throughout a facility and between facilities in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some instances, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems

230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another instance, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Some embodiments may be used across facilities in a fulfillment network. An example fulfillment network 290 is depicted in FIG. 2. The fulfillment network 290 may include a number of fulfillment centers, a number of sort centers, a number of delivery stations, and so forth. The fulfillment centers may be used to pack items for fulfillment. Packed items may be routed to a sort center for redirection to an appropriate delivery station. In some instances, packed items may be routed directly to a delivery station while bypassing sort centers. Embodiments of the foldable containers described herein may be configured to move from a first facility to a second facility, a third facility, and so on, so as to seamlessly move amongst different facilities in a fulfillment network. For example, a foldable container may move from a fulfillment center to a sort center, and then on to a delivery station or other facility, thereby providing a flexible and dynamic solution without having to unload contents of the foldable container. At any of the locations, the foldable containers may be dumped with reduced jams.

Embodiments of the disclosure include foldable guiding robots transporting containers using applied force detection. The foldable containers may be used to store, at least temporarily, packages or other items. Certain embodiments may improve processing speed and/or throughput of fulfillment centers. Certain embodiments may improve performance of mechanical equipment for sortation and/or consolidation of items for multi-item orders via increased tolerances. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3A:
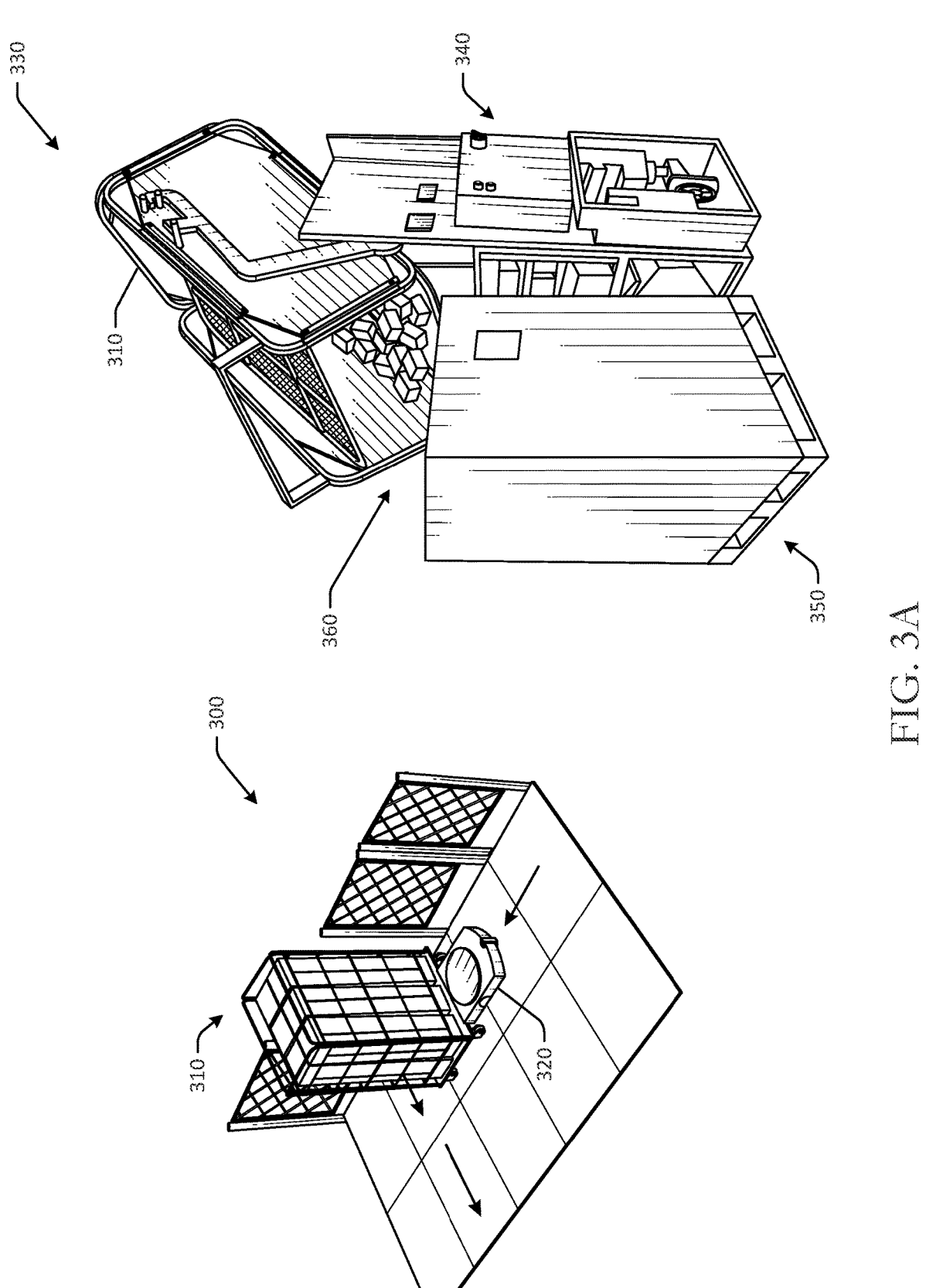
FIGS. 3A-3B are schematic illustrations of a container being dumped and being transported using a mobile robot in accordance with one or more embodiments of the disclosure.
Figure 3B:
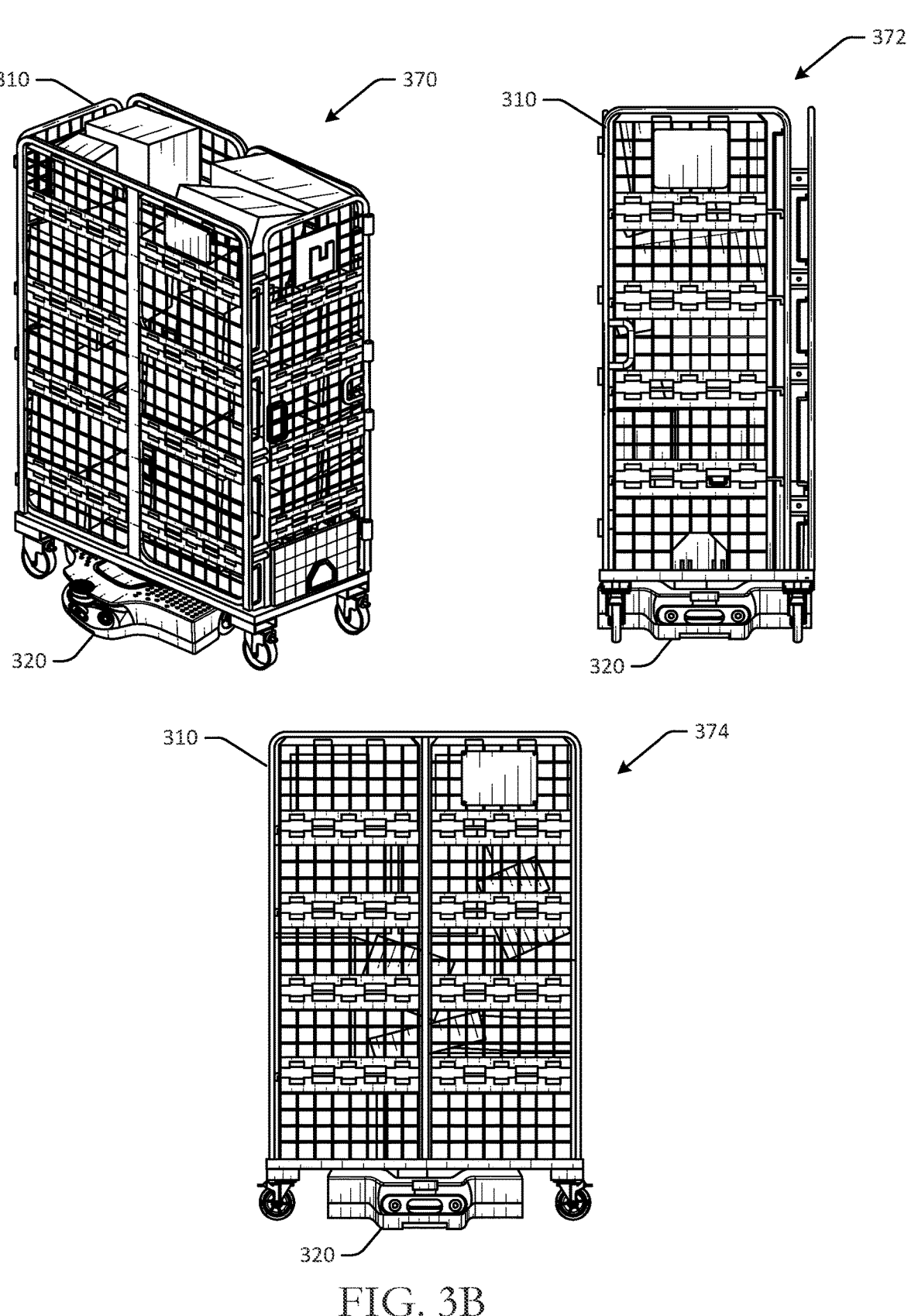

FIGS. 3A-3B are schematic illustrations of a container being dumped and being transported using an autonomous robot in accordance with one or more embodiments of the disclosure. Other embodiments may include additional or fewer components. The illustration of FIGS. 3A-3B are not to scale, and may not be illustrated to scale with respect to other figures.

In the example of FIG. 3A, a foldable container 310 may be positioned in an environment 300, such as a fulfillment center floor, a warehouse environment, or another environment. To move throughout the environment 300, the foldable container 310 may be rolled using one or more wheels. For example, a manual operator may move the foldable container 310 by pushing or pulling the foldable container 310 from one location to another. The foldable container 310 may receive, carry, and transport various packages, boxes, items, products, or other objects of various types. In addition, the foldable container 310 may be configured to be lifted, carried, moved, and placed between positions within a material handling facility by robotic drive units, such as the robot 320, or other material handling equipment. In this manner, the foldable container 310 can be pushed by associates on surfaces, e.g., sort center floors, and the foldable container 310 can also be carried and transported by robotic drive units 320.

The foldable container 310 may also be moved using a robot 320, such as an autonomous robot. For example, the robot 320 may be configured to tunnel or otherwise position itself underneath the foldable container 310. The robot 320 may then lift the foldable container 310 off the ground, such that the wheels are separated from the ground, and the robot 320 may then transport the foldable container 310 from one location to another.

The foldable container 310 may maintain the ability to be moved by humans and robots, while also maintaining the ability to fold from a rectangular configuration to an L-shaped folded configuration. The foldable container 310 may include a locking bottom container platform that provides structural rigidity to enable lifting by the robot 320, while also providing the ability for the foldable container 310 to fold.

Accordingly, the foldable container 310 may be configured to be transported using both (i) the one or more, or plurality, of wheels via manual pushing, and (ii) robotic manipulation to lift and move the foldable container 310, such as by the robot 320. The foldable container 320 may be configured to allow an autonomous robot, such as the robot 320, to tunnel underneath a bottom container platform of the foldable container 310. The foldable container 310 may be configured to be lifted from the bottom container platform by an autonomous robot or other robot 320 that is positioned at least partially or entirely underneath a center or middle portion of the foldable container 310 when the foldable container 310 is in the unfolded position (e.g., a rectangular configuration, etc.).

The wheels may include one or more freely-rotating swivel casters associated with a bottom surface of the foldable container 310. For example, the foldable container 310 may include four freely-rotating swivel casters, with one positioned at each corner of the foldable container 310. In some examples, two of the four casters may have a swivel locking feature, such as a manually or foot-operated swivel locking feature, and the other two of the four casters may have a caster rotation locking feature, such as a manually or foot-operated caster rotation locking feature.

To empty the contents of the foldable container 310, such as onto a conveyor, into another container 350 (e.g., a Gaylord, box, etc.), the foldable container 310 may be rotated at least partially upside down during a dumping process 330. The dumping process 330 may be manual or automated and may be performed using various equipment 340. During dumping, packages or other items 360 may be unloaded from the foldable container 310 and onto another surface and/or into another container.

In FIG. 3B, the container 310 is depicted in various views, such as a perspective view 370 with the robot 320 positioned underneath. The container 310 may be filled with packages or other items. In side view 372 and front view 374, the robot 320 is depicted lifting the container 310 off a ground surface for transport. The robot 320 may transport the container 310 throughout a facility, onto or off of trailers, and/or other locations.

Figure 4:
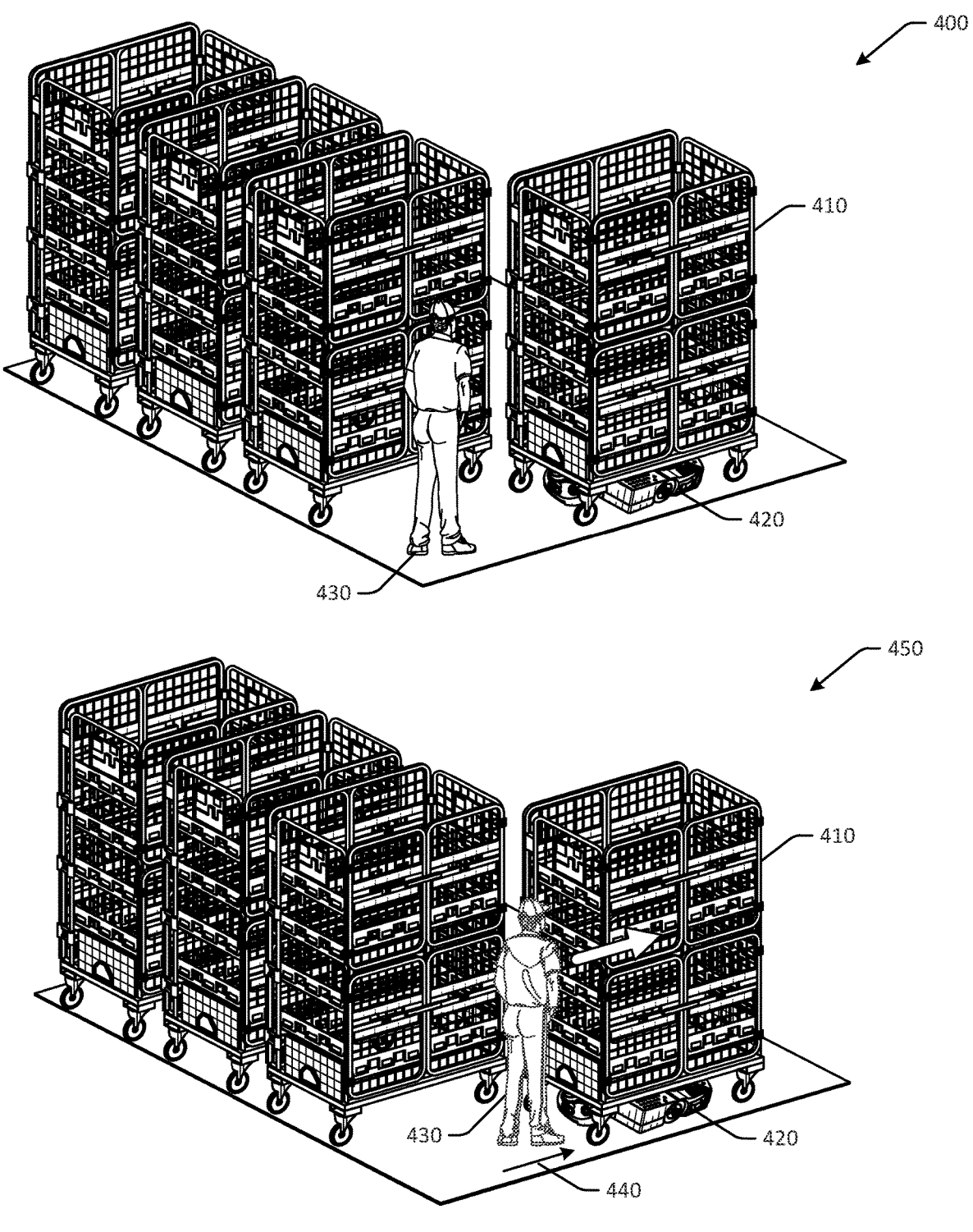
FIG. 4 is a schematic illustration of example force feedback detection by a mobile robot transporting a container in accordance with one or more embodiments of the disclosure.

FIG. 4 is a schematic illustration of example applied force detection by an autonomous robot transporting a container in accordance with one or more embodiments of the disclosure. Other embodiments may include additional or fewer components. The illustrations of FIG. 4 may not be to scale, and may not be illustrated to scale with respect to other figures. The container and robot illustrated in FIG. 4 may be the same container and/or robot discussed with respect to FIGS. 1-3B.

In FIG. 4, at a first instance 400, a robot 420 may be stationary and ready to transport a container 410 near an operator 430. The operator 430 may control movement of the robot 420 by applying a force to the container 410, where the direction of force may be detected by the robot 420 and a corresponding direction of travel for the robot 420 may be determined. In some instances, a speed of the robot 420 may be determined based at least in part on an amount of force applied by the operator 430 and/or the rate at which the force was applied.

For example, at a second instance 450, the operator 430 may apply a force on the container 410 in a direction 440. The robot 420 may detect the force applied to the container 410, and may initiate a number of actions, such as orienting one or more wheels in the direction 440 (e.g., using one or more actuators to control wheel positioning, etc.), causing a motor or other drive mechanism to propel the robot 420 in the direction 440, and/or additional actions. The robot 420 may automatically detect the force applied on the container 410 while the container 410 is loaded on the robot 420.

The robot 420 may be a mobile robot and/or an autonomous robot configured to transport the container 410. The autonomous robot may include a first load cell, a second load cell arranged along a first axis with respect to the first load cell, and a third load cell arranged along a second axis with respect to the first load cell. Other types of sensors, such as optical sensors, strain gauges, pressure sensors, weight sensors, and/or other sensors may be used. In some embodiments, sensors may include one or more subsensors, so as to provide a redundancy and allow for detection of faulty sensors. For example, a first sensor may include a first subsensor and a second subsensor, such as a load cell sensor having two load cell subsensors. A second sensor may include a third subsensor and a fourth subsensor, and so forth. To determine faulty sensors, a controller may compare measurements from the two correlated subsensors, and if a difference between the measurements meets or exceeds a threshold, one of the subsensors may be determined to be faulty. Therefore, the controller may be configured to determine, using the second subsensor, that the first subsensor is faulty, and may optionally determine, using the third subsensor, that the fourth subsensor is faulty.

The autonomous robot may include a motor, one or more wheels, and a controller. To automatically detect force feedback on the container, the controller may be configured to determine that the container 410 is loaded on the autonomous robot 420, and may determine, using at least one of the first load cell and the second load cell, a first change in load distribution. The change in load distribution may reflect a change in center of gravity of the container 410. In some instances, the change in load distribution may be determined along a first axis, and may optionally be compared to a threshold. The threshold may be a function of the weight of the container 410 and/or a function of the position of the center of gravity of the container 410. If the threshold is satisfied, this may indicate the force applied is an intended force (e.g., instead of an error or a passive force, etc.). The controller may determine that the first change in load distribution has persisted for a first length of time, such as about 3 seconds or about 5 seconds, and may cause the mobile robot to begin moving in a direction of movement corresponding to the direction of force.

Figure 5A:
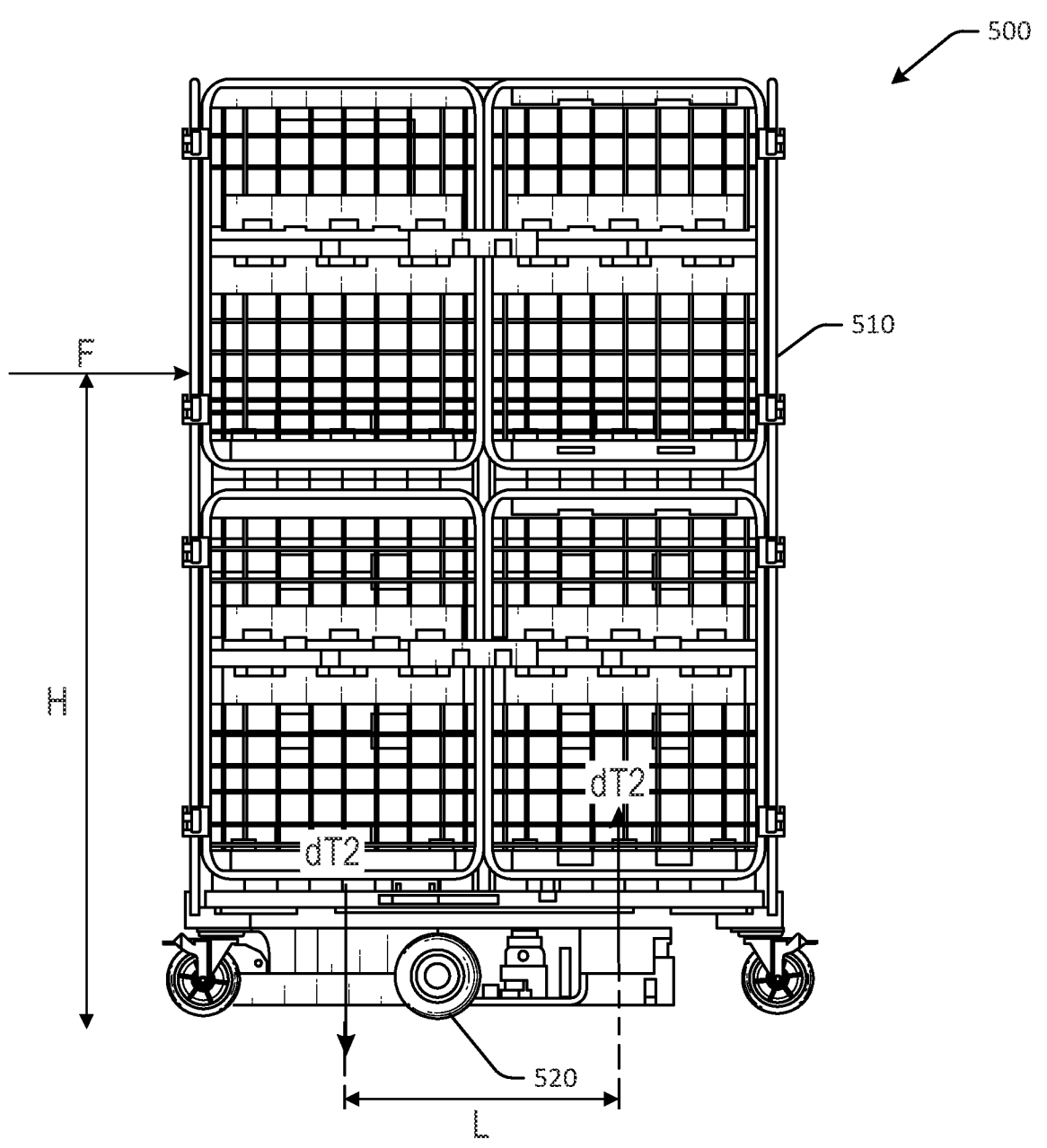
FIGS. 5A-5C are schematic illustrations of example forces applied to a container being transported by an autonomous robot in accordance with one or more embodiments of the disclosure.
Figure 5B:
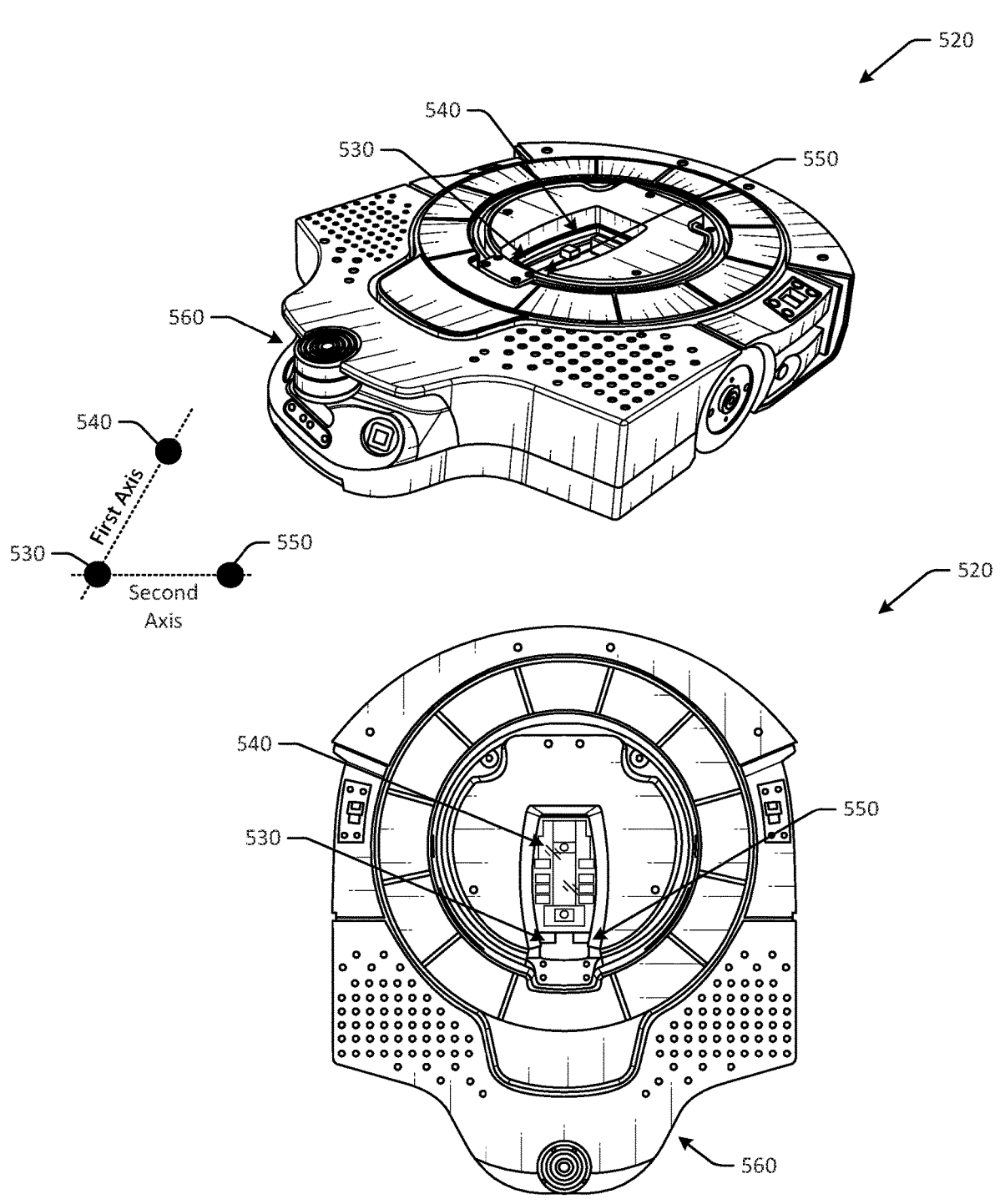
Figure 5C:
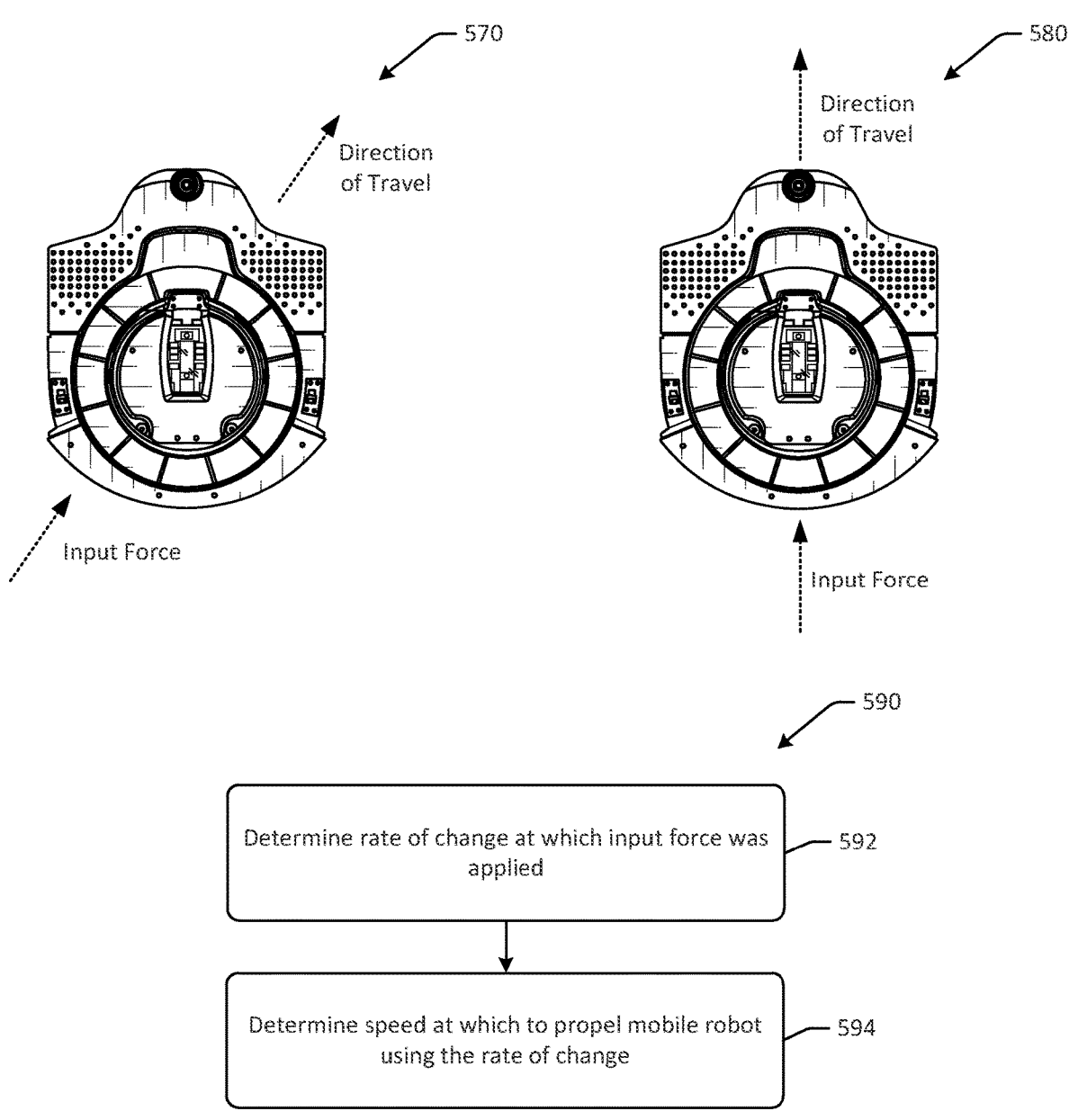

FIGS. 5A-5C are schematic illustrations of example forces applied to a container being transported by an autonomous robot in accordance with one or more embodiments of the disclosure. Other embodiments may include additional or fewer components. The illustrations of FIGS. 5A-5C may not be to scale, and may not be illustrated to scale with respect to other figures. The robot illustrated in FIGS. 5A-5C may be the same robot discussed with respect to FIGS. 1-4.

In FIG. 5A, a schematic view 500 of a container 510 loaded on a robot 520 in front view is presented. The schematic view 500 illustrates example forces that may be applied to the container 510 during transport by the robot 520, where the forces may be detected via one or more sensors of the robot 520, as depicted in FIG. 5B. For example, in FIG. 5B, the robot 520 may include a first sensor 530, a second sensor 540, a third sensor 550, and so forth. Some embodiments may include one sensors, whereas other embodiments may include at least two sensors. Any suitable sensor, such as load cells, weight sensors, pressure sensors, strain gages, and so forth, may be used. The robot 520 may be a mobile robot configured to transport the container 510. The mobile robot 520 may include the first sensor 530, the second sensor 540, a motor 560, and a controller (such as that depicted in FIG. 7). The first sensor 530 and the second sensor 540 may be configured to detect a first change in load distribution along a first axis, such as an X-axis along a top of the robot 520. The first sensor 530 and the third sensor 550 may be configured to detect a second change in load distribution along a second axis, such as a Y-axis along the top of the robot 520. Accordingly, the first sensor 530 may be aligned with both the second sensor 540 and the third sensor 550 along separate axes. The robot 520 may include a lift plate, and one or more of the sensors may be disposed on the lift plate. In one embodiment, the first sensor 530, the second sensor 540, and the third sensor 500 are disposed on the lift plate.

In FIG. 5A, a force F may be applied anywhere along the container 510. The force F may be applied at a certain height H along the container 510. As the force F is applied, a moment is created about the container 510, and weight will shift between the load cells. The magnitude T of the weight shift is proportional to the force exerted on the container 510 and the height at which the force is applied. A distance L between two sensors, such as two load cells, of the robot 520 may be used to calculate the total weight shift dT2. Specifically, the change in T equals the height H times the force F, divided by the distance L: $\Delta(T)=((HF)/L)$.

The distance L between the load cells or other sensors is determined by the geometry of the robot 520. In one example, an estimate for the magnitude of force F and height H may be used. In the example, F can be assumed to be 195N based on recommended ergonomic pushing force and H can be assumed to be 1.24 m based on empirical data. Based on these numbers, a total weight transfer $\Delta T$ can be about 475N. This means that the front load cell reading will drop by 475N and the rear load cell(s) reading will show a combined increase of 475N. 475N can therefore be an example threshold.

The controller may, in one example, determine, after determining that the container is loaded, a first baseline load distribution along the first axis using the first load cell and the second load cell. The first baseline load distribution may be determined each time a container is loaded. The first baseline load distribution may represent a baseline or measured center of gravity measurement and/or weight distribution. The first baseline load distribution may be determined by the robot in a static position or while the robot is in motion. The controller may optionally determine a second baseline load distribution along the second axis using the first load cell and the third load cell. In some embodiments, only one baseline load distribution along one axis may be used to determine forces applied to the container during movement. The controller may determine a weight of the container using at least one of the first load cell, the second load cell, or the third load cell, where a threshold to trigger movement of the robot 520 in a particular direction is a function of the weight.

In FIG. 5C, a first example 570 depicts a direction of input force and corresponding direction of travel of the robot 520. The robot 520 may continue in the direction of travel as long as the input force is present. A speed of the robot 520 may be modified based at least in part on the amount of input force, where the greater the input force, the greater the rate of speed at which the robot 520 moves. In some instances, if the robot 520 is unable to move in a particular direction, such as a 90 degree right hand turn, the robot 520 may move in a direction that allows the robot 520 to eventually move in the desired direction, such as making a curved right hand turn.

Direction of movement or travel can be modified in real-time while the mobile robot 520 is in motion. For example, an operator applying force can change the direction of travel by changing the angle at which the input force is applied. The controller and/or mobile robot 520 may therefore determine a second change in load distribution while the motor is propelling the mobile robot 520 in a first direction of movement, and may determine a second direction of movement associated with the second change. The controller and/or mobile robot 520 may cause the motor to propel the mobile robot in the second direction of movement.

In a second example 580, an input force in a forward direction may cause the robot 520 to move in the forward direction while the force is applied. When the force is removed, the robot 520 may slow down and/or apply brakes to come to a complete stop. In some embodiments, the rate of braking may be adjusted based at least in part on the rate at which the force is removed from the container on the robot 520 (e.g., rapid braking when the force is rapidly removed, etc.). The second example 580 may be during the same movement session as the first example 570, where the operator may change the angle at which the input force is applied to switch from a diagonal direction of movement to a forward direction of movement.

An example process flow 590 may be implemented to determine dynamic rates of speed for the mobile robot 520, where the dynamic speed may be adjusted based at least in part on the input force amount and rate at which the input force was applied. For example, at block 592, the mobile robot 520 may determine a rate of change at which the input force was applied. The rate of change may be the rate at which the force was applied or removed from the container or other payload. At block 594, the mobile robot 520 may determine a speed at which to propel the mobile robot 520 using the rate of change. For example, if the rate of change was high, the mobile robot 520 may accelerate or decelerate quickly, whereas if the rate of change was low, the mobile robot 520 may accelerate or decelerate relatively slowly. In other embodiments, the amount of force may be used instead of, or in addition to, the rate of change to determine a corresponding amount of speed. The mobile robot 520 may therefore determine a rate of change at which the first change in load distribution occurred and/or at which the input force was applied, and may determine a speed that corresponds to the rate of change. The mobile robot 520 may cause the motor to propel the mobile robot in the first direction of movement at the speed.

Figure 6:
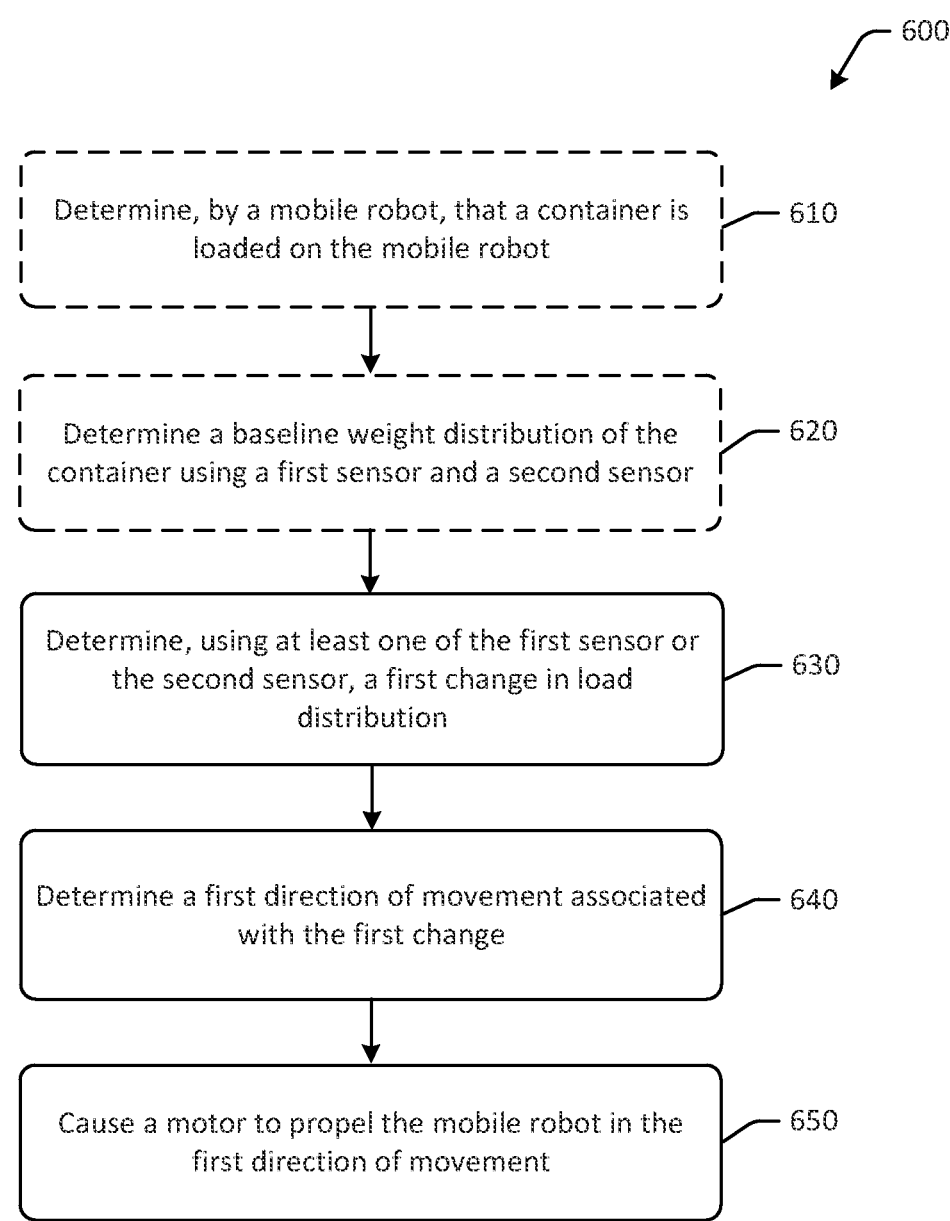
FIG. 6 is a schematic illustration of an example process flow for force feedback detection by an autonomous robot transporting a container in accordance with one or more example embodiments of the disclosure.

FIG. 6 is a schematic illustration of an example process flow 600 for applied force detection by an autonomous robot transporting a container in accordance with one or more example embodiments of the disclosure. While example embodiments of the disclosure may be described in the context of autonomous robots, it should be appreciated that the disclosure is more broadly applicable to any type of mobile robot. Some or all of the blocks of the process flows in this disclosure may be performed in a distributed manner across any number of devices. The operations of the process flow 600 may be optional and may be performed in a different order.

In one example embodiment, the process flow 600 may be executed to automatically detect force feedback for autonomous robots transporting containers. The process flow 600 may be executed by a controller onboard an autonomous robot and/or a computer system in communication with the robot. The process flow 600 may be used to cause the robot to move in a certain direction, adjust a speed of movement, and/or implement other actions.

At optional block 610 of the process flow 600, computer-executable instructions stored on a memory of a device, such as a remote server or a controller, may be executed to determine, by a mobile robot, that a container is loaded on the mobile robot. For example, a control module executed at a controller or computer system associated with a robot may determine that a container is loaded on the mobile robot. The mobile robot may determine that the container is loaded based at least in part on feedback from one or more sensors, such as load cells disposed on a surface, such as a lift plate, of the mobile robot.

At optional block 620 of the process flow 600, computer-executable instructions stored on a memory of a device, such as a remote server or a controller, may be executed to determine a baseline weight distribution of the container using a first sensor and a second sensor. For example, a control module executed at a controller or computer system associated with a robot may determine a baseline weight distribution of the container using a first sensor and a second sensor. The weight distribution may be a load distribution and may be measured along a particular axis. For example, after determining that the container is loaded, the mobile robot may determine a first baseline load distribution along the first axis using the first sensor and the second sensor. The first sensor and the second sensor may be aligned along an axis of the lift plate. In some embodiments, baseline distributions may be determined along more than one axis. The baseline weight distribution may be used to determine changes to the center of gravity of the container, which result from force being applied to the container (or other payload). The change in center of gravity can therefore be used as a representation or indication of input force.

At block 630 of the process flow 600, computer-executable instructions stored on a memory of a device, such as a remote server or a user device, may be executed to determine, using at least one of the first sensor or the second sensor, a first change in load distribution. For example, a control module executed at a controller or computer system associated with a robot may determine, using at least one of the first sensor or the second sensor, a first change in load distribution. The first change in load distribution may be relative to the baseline weight distribution and/or relative to an immediately prior determined load distribution. The determined change in load distribution may signify an input force being applied to the container loaded on the mobile robot.

In some instances, the controller and/or mobile robot may compare the change in load distribution to a threshold to determine it is not an error or otherwise unintended. For example, the controller may determine, using at least one of the first sensor or the second sensor, that a change in weight distribution satisfies a threshold. In some embodiments, the robot may determine that a first change in load distribution along a first axis satisfies a threshold. The threshold may be determined as a function of the weight of the container, or may be static. In one example, the controller may determine a weight of the container using at least one of the first load cell, the second load cell, or the third load cell, where the threshold is a function of the weight. The threshold may be the same for all containers or may be determined for individual containers lifted for transport by the robot. In another example, the controller may determine, after determining that the container is loaded, a first baseline load distribution using the first sensor and the second sensor, where the first change in load distribution is relative to the first baseline load distribution.

In another example, the controller may determine whether the change in load distribution has persisted for a certain length of time, so as to avoid reaction to an unintended bump or force input. For example, the controller may determine that the first change in load distribution has persisted for a first length of time (e.g., 1 second, 3 seconds, etc.) prior to causing the motor to propel the mobile robot. In another example, a control module executed at a controller or computer system associated with a robot may determine that the change in the weight distribution has persisted for a length of time. The controller may determine that a first change in load distribution has persisted for a first length of time. The length of time may be used to ensure that transient changes due to acceleration, turns, etc. are not misread as force feedback. In one example, the length of time may be 1 second, 3 seconds, 5 seconds, or another value.

In instances where thresholds are used for force input, such thresholds may be configured based on a container or payload weight. For example, the controller may determine a weight of the container using at least one of the first sensor or the second sensor, and may determine that the first change in load distribution along the first axis satisfies a threshold prior to causing the motor to propel the mobile robot, where the threshold is a function of the weight. For example, the greater the weight of the container, the less the force or change in center of gravity needs to be to cause the robot to move.

At block 640 of the process flow 600, computer-executable instructions stored on a memory of a device, such as a remote server or a user device, may be executed to determine a first direction of movement associated with the first change. Depending on the angle of input force and/or the direction of the change in center of gravity, the controller may determine a corresponding direction of movement to be implemented. The direction of movement may correspond to the angle of force input. In some embodiments, the mobile robot may include a wheel and an actuator, and the controller may cause the actuator to orient the wheel in the determined direction of movement.

At block 650 of the process flow 600, computer-executable instructions stored on a memory of a device, such as a remote server or a user device, may be executed to cause the motor to propel the mobile robot in the first direction of movement. For example, the mobile robot may include a motor or other drive mechanism, and the drive mechanism may be actuated to cause movement of the mobile robot in the determined direction of movement. For situations where the direction of movement is not possible, such as hard turns, the robot may navigate a path to the direction, such as by moving in a curved or diagonal path. The movement may continue until the direction of input force changes and/or the force is no longer applied, at which time the robot may apply a brake and/or otherwise come to a stop. For example, the controller may determine that a first change in load distribution is not present and may cause the mobile robot to stop movement. In one example, the robot may include a brake system that may be applied to stop movement of the robot. In other embodiments, the robot may coast to a stop and/or apply brakes at an intensity corresponding to the rate at which the input force was removed from the container or other payload.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
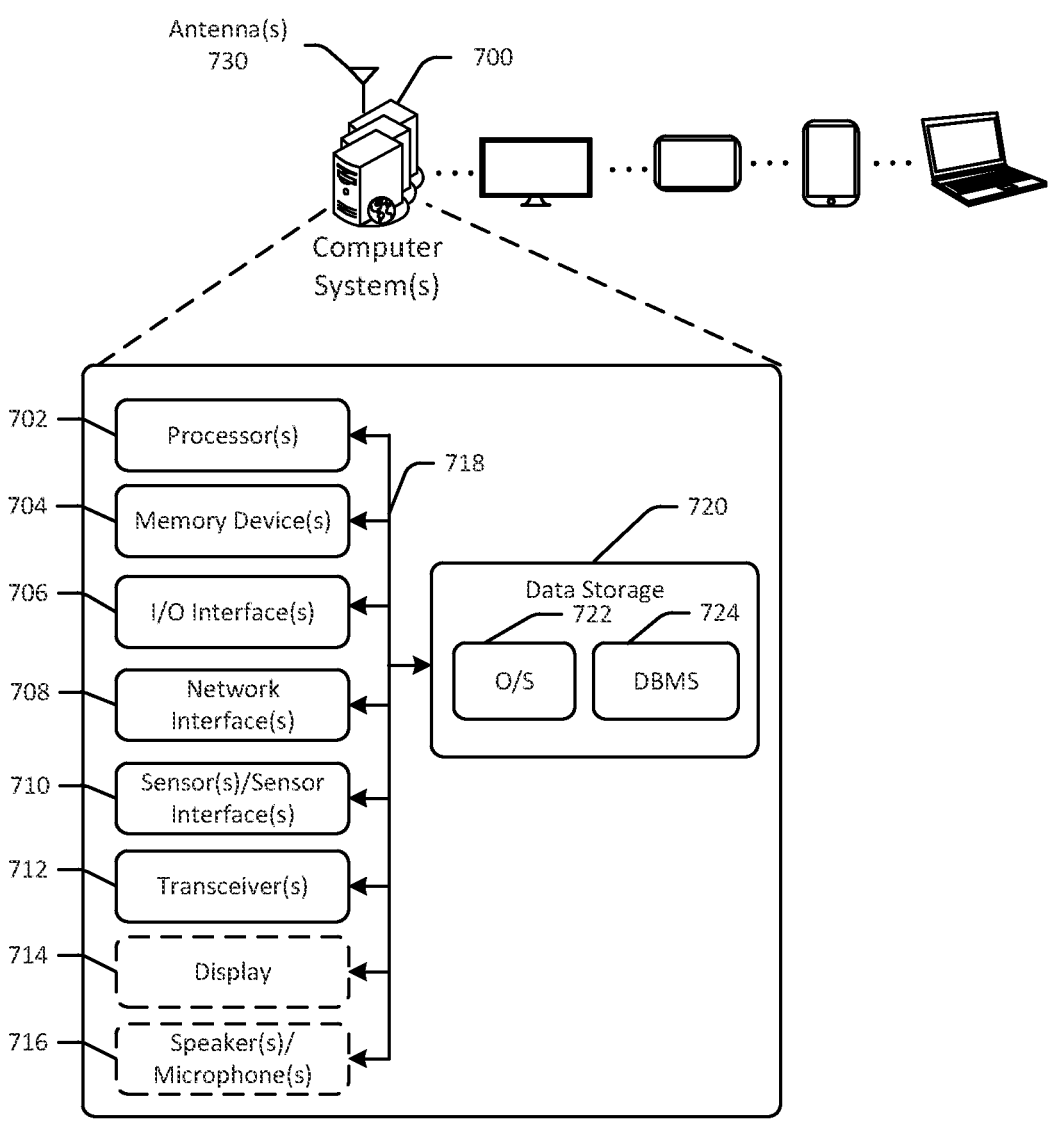
FIG. 7 schematically illustrates an example architecture of a computer system associated with a mobile robot in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for a computer system used in conjunction with any one of the robotic system(s) of FIGS. 1-6, such as robotic manipulators and/or autonomous robotic vehicles.

The computer system(s) 700 may be configured to communicate with one or more servers, user devices, or the like. The computer system(s) 700 may be configured to cause the robotic system(s) to deposit containers into one or more pods, retrieve containers, transport containers, dump containers, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allo-cation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, dis-tributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these compo-nents may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), Fire Wire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of commu-nication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications Sys-tem (UMTS), Wideband Code Division Multiple Access (W-CDMA), CDMA2000, etc.), 4G standards (e.g., Long-Term Evolution (LTE), WiMax, etc.), direct satellite com-munications, or the like.

The antenna(s) 730 may additionally, or alternatively, include a Wi-Fi antenna configured to transmit or receive signals in accordance with established standards and proto-cols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving-poten-tially in cooperation with any of antenna(s) 730—commu-nications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communica-tions protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/micro-phone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An autonomous robot configured to transport a container, the autonomous robot comprising:
    a first load cell;
    a second load cell arranged along a first axis with respect to the first load cell;
    a third load cell arranged along a second axis with respect to the first load cell;
    a motor;
    a plurality of wheels; and
    a controller configured to:
        determine that the container is loaded on the autonomous robot;
        determine, using at least one of the first load cell and the second load cell, that a first change in load distribution along the first axis satisfies a threshold, wherein the first change is based at least in part on a force applied to the container;
        determine a first direction of movement associated with the first change;
        cause the motor to propel the autonomous robot in the first direction of movement;
        determine that the first change in load distribution is not present based at least in part on removing the force applied to the container;
        determine a first rate of change at which the force is removed; and
        cause the mobile robot to stop movement at a rate of braking that corresponds to the first rate of change.

2. The autonomous robot of claim 1, wherein the controller is further configured to:

determine a second change in load distribution while the motor is propelling the autonomous robot in the first direction of movement;

determine a second direction of movement associated with the second change; and cause the motor to propel the autonomous robot in the second direction of movement.

3. The autonomous robot of claim 1, wherein the controller is further configured to:

determine a second rate of change at which the first change in load distribution occurred;

determine a speed that corresponds to the second rate of change; and cause the motor to propel the autonomous robot in the first direction of movement at the speed.

4. The autonomous robot of claim 1, further comprising:

a lift plate;

wherein the first load cell, the second load cell, and the third load cell are disposed on the lift plate.

5. A mobile robot configured to transport a container, the mobile robot comprising:

a first sensor;

a second sensor;

a motor; and a controller configured to:

determine that the container is loaded;

determine, using at least one of the first sensor or the second sensor, a first change in load distribution, wherein the first change is based at least in part on a force applied to the container;

determine a first direction of movement associated with the first change;

cause the motor to propel the mobile robot in the first direction of movement;

determine that the first change in load distribution is not present based at least in part on removing the force applied to the container;

determine a first rate of change at which the force is removed; and cause the mobile robot to stop movement at a rate of braking that corresponds to the first rate of change.

6. The mobile robot of claim 5, wherein the controller is further configured to:

determine a second change in load distribution while the motor is propelling the mobile robot in the first direction of movement;

determine a second direction of movement associated with the second change; and cause the motor to propel the mobile robot in the second direction of movement.

7. The mobile robot of claim 5, wherein the controller is further configured to:

determine, after determining that the container is loaded, a first baseline load distribution using the first sensor and the second sensor;

wherein the first change in load distribution is relative to the first baseline load distribution.

8. The mobile robot of claim 5, further comprising:

a brake system;

wherein the controller is configured to cause the mobile robot to stop movement by causing the brake system to be applied.

9. The mobile robot of claim 5, wherein the controller is further configured to:

determine a weight of the container using at least one of the first sensor or the second sensor; and determine that the first change in load distribution along the first axis satisfies a threshold prior to causing the motor to propel the mobile robot, wherein the threshold is a function of the weight.

10. The mobile robot of claim 5, wherein the controller is further configured to:

determine that the first change in load distribution has persisted for a first length of time prior to causing the motor to propel the mobile robot.

11. The mobile robot of claim 5, further comprising:

a third sensor;

wherein the first sensor and the third sensor are configured to detect a second change in load distribution along a different axis than the first sensor and the second sensor.

12. The mobile robot of claim 11, further comprising:

a wheel; and an actuator;

wherein the controller is further configured to:

cause the actuator to orient the wheel in the first direction of movement.

13. The mobile robot of claim 11, further comprising:

a lift plate;

wherein the first sensor, the second sensor, and the third sensor are disposed on the lift plate.

14. The mobile robot of claim 11, wherein the first sensor and the second sensor are aligned along a first axis, and the first sensor and the third sensor are aligned along a second axis; and wherein the first axis and the second axis are non-perpendicular.

15. The mobile robot of claim 5, wherein the first sensor comprises a first subsensor and a second subsensor, and the second sensor comprises a third subsensor and a fourth subsensor.

16. A method comprising:

determining, by a mobile robot comprising a first sensor, a second sensor, and a motor, that a container is loaded on the mobile robot;

determining, using at least one of the first sensor or the second sensor, a first change in load distribution, wherein the first change is based at least in part on a force applied to the container;

determining a first direction of movement associated with the first change;

causing the motor to propel the mobile robot in the first direction of movement;

determining that the first change in load distribution is not present based at least in part on removing the force applied to the container;

determining a first rate of change at which the force is removed; and causing the mobile robot to stop movement at a rate of braking that corresponds to the first rate of change.

17. The method of claim 16, further comprising:

determining a second change in load distribution while the motor is propelling the mobile robot in the first direction of movement;

determining a second direction of movement associated with the second change; and causing the motor to propel the mobile robot in the second direction of movement.

18. The method of claim 16, further comprising:

determining, after determining that the container is loaded, a first baseline load distribution using the first sensor and the second sensor;

wherein the first change in load distribution is relative to the first baseline load distribution.

19. The method of claim 16, further comprising:

determining a second rate of change at which the first change in load distribution occurred;

determining a speed that corresponds to the second rate of change; and causing the motor to propel the mobile robot in the first direction of movement at the speed.

\* \* \* \* \*